(12) United States Patent
Smith et al.

(10) Patent No.: US 6,238,790 B1
(45) Date of Patent: May 29, 2001

(54) SUPERDIELECTRIC HIGH VOLTAGE INSULATION FOR DYNAMOELECTRIC MACHINERY

(75) Inventors: James D. B. Smith, Monroeville, PA (US); Franklin T. Emery, Orlando, FL (US); Karl F. Schoch, Jr., Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/320,202

(22) Filed: May 26, 1999

(51) Int. Cl.[7] .............. B32B 15/00; H01B 7/00; B08K 3/34
(52) U.S. Cl. .......... 428/379; 428/372; 428/375; 174/121 AR; 174/110 SR; 524/450; 524/445; 524/447; 523/207; 523/206; 523/216
(58) Field of Search ............... 428/372, 375, 428/379; 174/121 AR, 110 SR; 524/450, 445, 446, 447, 448, 449; 523/207, 206, 216

(56) References Cited

U.S. PATENT DOCUMENTS

| | | | |
|---|---|---|---|
| 3,845,438 | * 10/1974 | Mendelsohn et al. | 174/120 C |
| 3,930,915 | * 1/1976 | Mendelsohn et al. | 156/53 |
| 4,112,183 | 9/1978 | Smith | 428/363 |
| 4,222,802 | * 9/1980 | Saki et al. | 156/53 |
| 4,254,351 | 3/1981 | Smieth et al. | 310/45 |
| 4,576,856 | * 3/1986 | Kuwajima et al. | 428/241 |
| 4,889,885 | 12/1989 | Usuki et al. | 524/445 |
| 5,698,624 | 12/1997 | Beall et al. | 524/445 |
| 5,721,306 | 2/1998 | Tsipursky et al. | 524/449 |
| 5,760,121 | 6/1998 | Beall et al. | 524/450 |
| 5,804,613 | 9/1998 | Beall et al. | 523/200 |
| 6,103,382 | * 8/2000 | Smith et al. | 428/417 |

OTHER PUBLICATIONS

Drljaca et al., A New Method for Generating Chromium (III) Intercalated Clays, *Inorganica Chimica Acta*, vol. 256, pp. 151–154, 1997.

Miller, Tiny Clay Particles Pack Potent Properties Punch, *Plastics World*, pp. 36–38, 1997.

Bjorklund, et al., A New Mica–Free Turn Insulation for Rotating HV Machines, *IEE International Symposium on on Electrical Insulation*, pp. 482–484, 1994.

Yano et al., Synthesis and Properties of Polyimide–Clay Hybrid, *Journal of Polymer Science*, vol. 31, pp. 2493–2498, 1993.

Drijaca et al., Intercaiation of Montmorillonite with Individual Chromoium (III) Hydrolytic Oligomers, *Inorganic Chemistry*, vol. 31, No. 23, pp. 4894–4897, 1992.

* cited by examiner

Primary Examiner—William Krynski
Assistant Examiner—J. M. Gray

(57) ABSTRACT

An electrically conducting member (2) is insulated with a thin coating (6) of a resinous insulation composition containing a resin interactive with and bonded to an oligomer containing a metal of at least one of Cr, Sn and Zn, where the oligomer is within a silicate type mica or clay structure.

21 Claims, 2 Drawing Sheets

SUPERDIELECTRIC HIGH VOLTAGE INSULATION FOR DYNAMOELECTRIC MACHINERY

BACKGROUND OF THE INVENTION

1. Field of the Invention

The invention relates to high dielectric strength capability epoxy resins, utilizing epoxy chromium ionic bonding within chromium intercalated silicate material upon cure, to provide a high voltage epoxy resin matrix for the intercalated silicate. These resins can be used for a wide variety of insulation applications for generator stators and rotors. The high dielectric strength will allow its use as very thin insulation and permit low-cost dip coating or spraying procedures to be used.

2. Background Information

Mica, a group of silicates, such as $KAl_2AlSi_3O_{10}(OH)_2$ (Muscovite) or $KMg_3AlSi_3O_{10}(OH)_2$ (phlogopite), has been long been a key component of high voltage electrical insulation in electrical machines over 7 Kv, because of its particularly high dielectric strength, low dielectric loss, high resistivity, excellent thermal stability and excellent corona resistance. Presently, mica is used in the form of flakes on a glass fabric backing, which provides mechanical integrity required for machine wrapping of coils, as shown for example in U.S. Pat. Nos. 4,112,183 and 4,254,351 (Smith and Smith et al.), respectively. In many cases, mica tape is wrapped around the coil and then impregnated with low viscosity liquid insulation resin by vacuum-pressure impregnation ("VPI"). That process consists of evacuating a chamber containing the coil in order to remove air and moisture trapped in the mica tape, then introducing the insulation resin under pressure to impregnate the mica tape completely with resin thus eliminating voids, producing resinous insulation in a mica matrix. This resin is subsequently cured by a prolonged heating cycle. In practice, complete elimination of voids is difficult, and the voids can be a recurring source of electrical and mechanical problems. And of course, the mica tape is thick, bulky, and difficult to apply to the coils.

Problems with mica as presently used occur in two areas: (1) microscopically, at the interface between the mica and polymeric insulation, and (2) in the VPI process required to fill the mica tape layers completely with polymeric insulation. The mica surface is a problem area because it is not "wet" very well by the insulation resin. Thus, there is a tendency for voids to form at the mica surface that are not completely eliminated during evacuation of the coil prior to impregnation with the insulation resin. Surface treatments of the mica or addition of wetting agents to the resin have not completely eliminated this problem to date. These voids can have significant consequences for both the electrical performance of the coil and its mechanical integrity. Electrically the voids can act as locations for partial discharges, which increase the electrical losses in the coil and can degrade the surrounding insulation during prolonged exposure. Mechanically the voids can be places where delamination can begin, causing potential disintegration of the coil.

The problems associated with the VPI process are primarily the result of the several steps involved: (1) bake out of the coil, (2) evacuation, (3) impregnation, and (4) curing. Each step is time-consuming and must be carried out correctly in order to produce a finished coil which meets the electrical and mechanical requirements. The process time and scrap coils represent significant increased cost of the coil fabrication method.

The requirement of using mica for high voltage insulation has been questioned. Bjorklund et al., of A.B.B., in "A New Mica-Free Turn Insulation For Rotating HV Machines," the *Conference Record of the 1994 IEEE International Symposium on Electrical Insulation*, June 5–8, 1994 pp. 482–484, taught use of a chromium oxide protective layer for a resin enamel as copper turn insulation, which was then and easily manufactured, as a substitute for arramed paper containing 50% mica. The nonlinearity of the chromium oxide apparently has a large impact on the absorption of free electron charges.

Others had previously experimented with highly positive charged materials having good thermal stability. Drljaca et al. in "Intercalation of Montmorillonite with Individual Chromium (III) Hydrolytic Oligomers", Vol. 31, No. 23, 1992, pp. 4894–4897, taught chromium inserted/intercalated pillared clays as having sorptive and catalytic properties and possible substitutes for zeolites, that is, sodium or calcium aluminosilicates used for ion exchange water softening. Drljaca et al. further described, in "A New Method for Generating Chromium (III) Intercalated Clays," *Inorganica Chimica Acta,* 256, 1997, pp. 151–154, Cr (III) dimer reaction with other dimer units to form planar sheets for intercalation into montmorillonite clays, $Al_2O_3.4SiO_2.H_2O$ In a different area, though still related to clays, Miller, in "Tiny Clay Particles Pack Patent Properties Punch," *Plastics World*, Fillers, October 1997, pp. 36–38, describes mineral filled plastic nanocomposites having excellent mechanical strength, heat resistance, flame retardancy and gas-barrier properties. These composites originally used nylon materials containing bundles of small platelets of montmorillonite clay, about 0.5 micrometer to 2 micrometers wide and 1 nanomeler (nm) thick, that is, 0.001 micrometer thick, for automobile timing belts. More recently, attempts have been made to incorporate such platelets into other resins. Miller further describes the platelets as having a high "aspect ratio," that is, high width compared to thickness, where molecular bonds are formed between the platelets and a polymer during compounding. The clay producers, such as Nancor Inc. and AMCOL Intl., chemically stretch, that is, "open" the spacing between the platelets from about 4 Angstrom Units, about 0.0004 micrometer, to a thickness such that organic resin molecules can directly ionically or covalently attach to the platelet surface, allowing the platelet to directly react into the polymer structure during subsequent polymerization/compounding. The platelet bundles are also exfoliated into individual platelets by the clay producers to aid in polymerization/compounding. The molecular "tail", Miller states, has the chemical functionality to overcome the incompatibility between the hydrophilic (having an affinity for water) clay and the hydrophobic (water-repelling) organic polymer and enable them to directly form a molecular bond, that is, directly intercalate the polymer into the nanoclay. Besides timing belts, additional uses appear to be thermoplastic resin gas barrier packaging, microwavable containers, and epoxy resin circuit boards.

These processes are also generally described by Usuki et al., of Toyota Chou, in U.S. Pat. No. 4,889,885. There, onium ions, from materials such as ammonium salts, sulfonium salts and phosphonium salts, were used to expand the interlayer distance of a clay such as montmorillonite through ion exchange with inorganic ions in the clay mineral. This permits the clay mineral to take a polymer into the interlayer space and connects the layers of clay mineral and polymer directly to each other through ionic bonds. The onium salt has a molecular skeleton which becomes the polymerization initiator. In cases where the onium salt has a molecular skeleton which becomes the basic constituting unit of the resin, the salt will have a phenol group (for phenolic resin), an epoxy group (for epoxy resin) and a polybutadiene group (for acrylonitrilebutadienerubber). Yano and Usuki et al. of Toyota R&D, in "Synthesis and Properties of Polyamide—Clay Hybrid", *Journal of Polymer Science*, Part A, Polymer Chemistry, Vol. 31, 1993, pp. 2493–2498, describe use of montmorillonite intercalated with an ammonium salt of dodecylamine as an aligned filler in a polyamide resin hybrid, for use as a gas barrier film. There, it appears a sodium type montmorillonite was mixed with hot water to disperse the sodium, which was then replaced with the ammonium salt of dodecylamine which then interacted with dimethylacetamide ("DMAC") to "open" the platelets of montmorillonite. The intercalated montmorillonite was then simply dispersed into a polyamide matrix and cast as a film, where the montmorillonite oriented parallel to the film surface to provide barriers to gas permeation.

The exfoliation and polymer intercalation of platelet bundles is also described in U.S. Pat. No. 5,698,624 (Beall et al.) where polymerizable monomers are directly intercalated between platelets or admixed with exfoliated material and then polymerized. Suitable polymers taught are polyamides, polyesters, polyurethanes and polyepoxides among others. Here organic ammonium molecules are inserted into sodium or calcium montmorillonite clay platelets to increase the thickness within the platelets, "open", followed by high shear mixing to exfoliate the silicate layers which are then directly mixed with a matrix polymer to improve mechanical strength and/or high temperature characteristics. All instances of polymer interaction with the platelets appear to be direct interaction between the polymer and the "opened" nanoplatelet. Other patents in this area include U.S. Pat. Nos. 5,721,306; 5,760,121; and 5,804,613 (Tsipursky et al.; Beall et al.; and Beall et al. respectively).

While impregnated and vacuum pressure impregnated mica tape remain the standard for high voltage electrical insulation and chromium oxide overcoats prove enhanced PD (partial discharge) resistance, the need still exists for ultra thin low cost high voltage electrical insulation that can be dip coated, sprayed or extruded on high voltage electrical conductors in one application yet will have all the desirable characteristics of the bulky mica matrix insulation.

SUMMARY OF THE INVENTION

Therefore, it is a main object of this invention to provide an improved low cost, high voltage electrical insulation that can replace impregnated mica flakes or mica tape and be applied in thin cross-sections while still providing high voltage protection and having high voltage endurance.

It is a further object of this invention to provide a low cost, high voltage electrical insulation that has a dramatic improvement in voltage endurance, and so can be applied in thin cross-sections, while still utilizing a silicon containing component.

It is a further object of this invention to provide a low cost high voltage electrical insulation that can be applied in thin cross-sections while still utilizing some of the advantages of tin and chromium compounds as evidenced by the Smith '183 patent and chromium and zinc compounds as evidenced by the Smith et al '351 patent.

These and other objects of the invention are accomplished by providing, an electrically conducting member, insulated with a coating of a resin interactive with and bonded to an oligomer which contains a metal selected from the group consisting of Cr, Sn, Zn and mixtures thereof, said oligomer disposed within an Al.Si.O containing structure, wherein said structure constitutes from about 3 wt. % to 35 wt% of the resin weight. Preferably the coating is from 0.1 cm to 0.3 cm thick, and is dip coated, sprayed or extruded onto a substrate such as a conductor, where the conductor can be metal coil for dynamoelectric machinery, such as 7 Kv or higher electrical generators.

The invention also resides in a method of making a resinous coating suitable for use as an electrical insulation, comprising the steps of (a) providing an oligomer containing a metal selected from the group consisting of Cr, Sn, Zn and mixtures thereof; (b) providing a solid Al.Si.O based material having a platelet form and having spaces between their constituent platelets, which spaces are capable of being expanded; (c) providing a liquid resin selected from the group consisting of polyepoxide resins, styrenated polyepoxide resins, polyester resins and 1,2-polybutadiene resins, which resins can interact and polymerize in the presence of Cr, Sr, and Zn; (d) inserting the metal containing oligomer into the spaces within the solid Al.Si.O based material; and (e) causing the liquid resin and the solid metal inserted Al.Si.O based material to contact each other to form a resinous admixture such that the metal inserted Al.Si.O solids are dispersed within the liquid resin. Further stemps can include (f) applying the resinous admixture to a substrate; and then (g) heating the metal inserted Al.Si.O liquid resin admixture so that the resin interacts with the metal causing interaction of the liquid resin and the oligomer and polymerization of the resin around and with the Al.Si.O solids to provide Al.Si.O solids within a cured polymerized solid matrix of resin.

Particularly useful resins are solventless polyepoxide (epoxy) resins, styrenated polyepoxide resins, polyester resins, and 1,2-polybutadiene resins, all of which can interact and polymerize in the catalytic presence of Cr, Sr and Zn. The preferred Al.Si-O structure is montmorillonite and the preferred oligomer is a Cr(III) oligometer. The voltage endurance of these materials greater than 1000 hours at 7.5 Kv/mm (188 volts/mil), and generally within the much higher range of 2800–3000 hrs. @ 188 volts/mil. The normal range of, for example, unfilled epoxy resin is 1000 hrs @ 188 volts/mil, thus the resins of this invention can be applied in thicknesses below 0.063 cm (0.025 inch) for voltages up to 35 Kv.

BRIEF DESCRIPTION OF THE DRAWINGS

These and other advantages of the invention will become apparent from the following description in view of the drawings.

DESCRIPTION OF THE PREFERRED EMBODIMENTS

Figure 1:
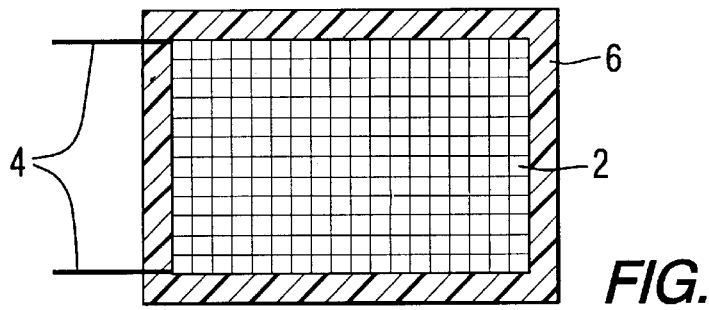
FIG. 1, which best shows the invention, is a cross sectional view of an encapsulated electrical article having a thin spray coating of the insulation of this invention.

Referring now to FIG. 1 of the drawings, an insulated electrical member, such as a coil 2 is shown, which has leads 4, potted in a thin cured insulating casing 6, the casing being the resinous composition of this invention applied to the member. FIG. 1 is thus illustrative of certain articles of the invention, namely, electrical or electronic components potted or encapsulated in the applied compositions of this invention.

Figure 2:
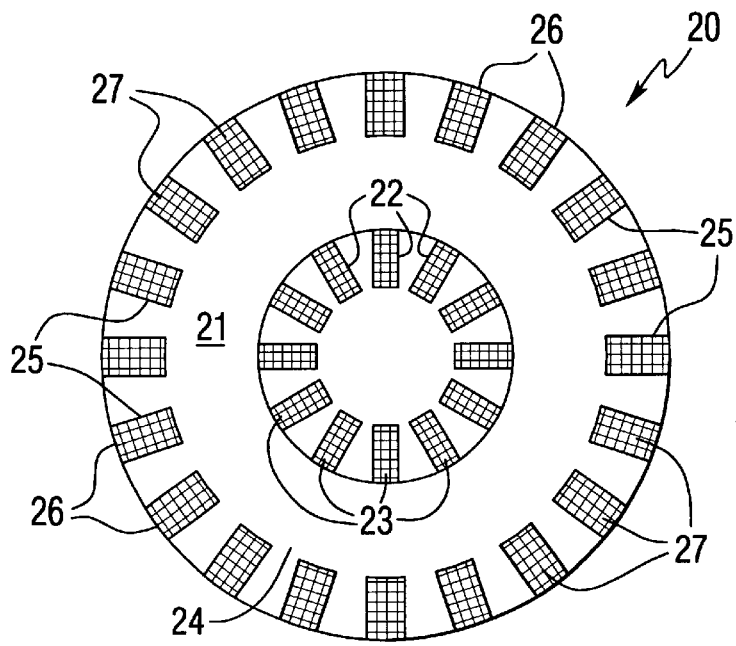
FIG. 2, is a cross sectional view of a motor, containing coils insulated with a thin dip coated or extruded layer of the insulation of this invention.
Figure 3:
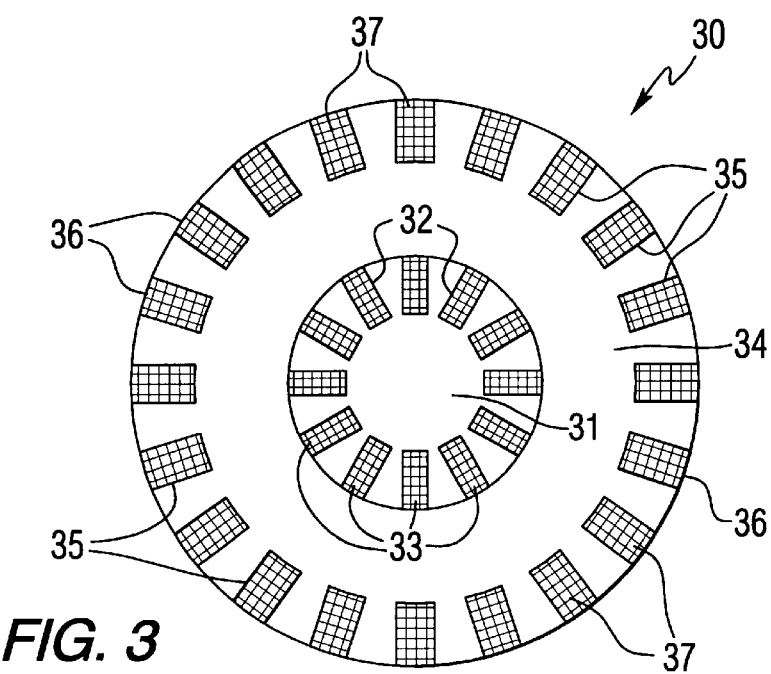
FIG. 3 is a cross-sectional view of generator, containing coils insulated with a thin dip coated or extruded layer of the insulation of this invention.

FIG. 2 shows one embodiment of a motor 20 in cross section. The motor comprises a metal armature 21 having slots 22 therein, containing insulated coils, surrounded by a metal stator having slots therein about the stator circumference at 26. The stator slots contain insulated coils 27. All the insulation coated on the coil substrates 23 and 27 can compose the resinous compositions of this invention. FIG. 3 shows one embodiment of a generator 30 in cross section. The generator comprises substrate components such as a metal rotor 31 having slots 32 therein, containing insulated coils 33, surrounded by a metal stator 34 having slots 35 therein about the stator circumference at 36. The stator slots contain insulated coils 37 and may also contain inner cooling channels not shown. All the insulation coated on the coils 33 and 37 can comprise the resinous compositions of this invention.

One type of resinous composition that can be used in this invention is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

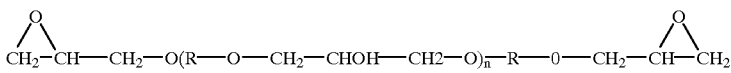

where n is an integer of the series 0, 1, 2, 3 . . . , and R represents the divalent hydrocarbon radical of the dihydric phenol. Typically R is:

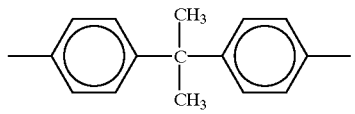

to provide a diglycidyl ether of bisphenol A type epoxide or

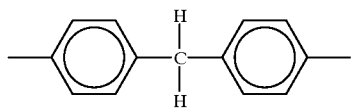

to provide a diglycidyl ether of bisphenol F type epoxide resin.

The bisphenol epoxides used in the invention have a 1,2-epoxy equivalency greater than one. They will generally be diepoxides. By the epoxy equivalency, reference is made to the average number of 1,2-epoxy groups.

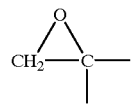

contained in the average molecule of the glycidylether.

Other glycidylether resins that are useful in this invention include polyglycidyl ethers of a novolac prepared by reacting an epihalohydrin with an aldehyde, for example a phenol formaldehyde condensate. Cycloaliphatic type expoxides are also useful, as are glycidyl ester epoxy resins, both being non-glycidyl ether epoxides, all of which are well known in the art and described in detail by Smith et al, in U.S. Pat. No. 4,254,351, where epoxidized polybutadiene, also useful in this invention is described. All of these previously described resinous compositions will be hereafter defined and described as "polyepoxide resins".

Other useful resins include polyesters, and 1–2, polybutadienes, all of which are well known in the art. Generally, polyester resins are a large group of synthetic resins, almost all produced by reaction of dibasic acids with dihydric alcohols. In a few cases trifunctional monomers such as glycerol or citric acid are used. The term "polyester resin" applies especially to the products made from unsaturated dibasic acids such as maleic acid. Unsaturated polyester resins can be further polymerized through cross linking. Often, another unsaturated monomer such as styrene is added during this second stage of the polymerization, which can occur at ordinary temperature with suitable peroxide catalysts. Maleic anhydride and fumaric acid are the usual unsaturated acid components, while phthalic anhydride, or adipic or azelaic acid are the corresponding saturated materials. Commonly used glycols are ethylene, propylene, diethylene, dipropylene, and certain butylene glycols. The added polymerizable monomer is styrene, vinyltoluene, diallyl phthalate or methyl methacrylate. In addition to the unsaturated polyester resins, there are other important types. One large group are the alkyd resins. These are made from saturated acid and alcohol monomers with many types of modifications, usually the inclusion of an unsaturated fatty acid.

Generally, 1,2-polybutadiene is a synthetic rubber made from butadiene $H_2C=CH—CH=CH_2$. In the 1,2- form, butadiene is caused to polymerize 1,2- so that the No. 1 carbon of each butadiene molecule becomes attached to the No. 2 carbon of another molecule. When this occurs the main backbone of the resulting polymer contains only the No. 1 and No. 2 carbons, while all the No. 3 and No. 4 carbons are in vinyl side chains, for example

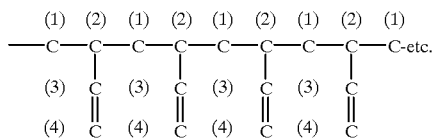

These 1,2-polybutadienes exist in isotactic, syndiotactic and atactic forms, but cannot have cis and trans forms.

Further, brief descriptions of these resins can be found in Rose, *The Condensed Chemical Dictionary*, 6th Ed. pp 909–911 (1961).

Useful oligomers containing a metal M, selected from the group consisting of Cr, Sn, Zn and their mixture can be of the dimer structure, for example:

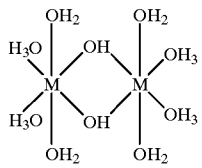

These oligomers can also be in other well known structures, for example the trimer, open tetramer, and closed tetramer structures, as set forth in great detail by Drljaca et al. in *Inorganic Chemistry* Vol. 31, No. 23, pp 4894–4897 (1992) where M=Cr.

Figure 4:
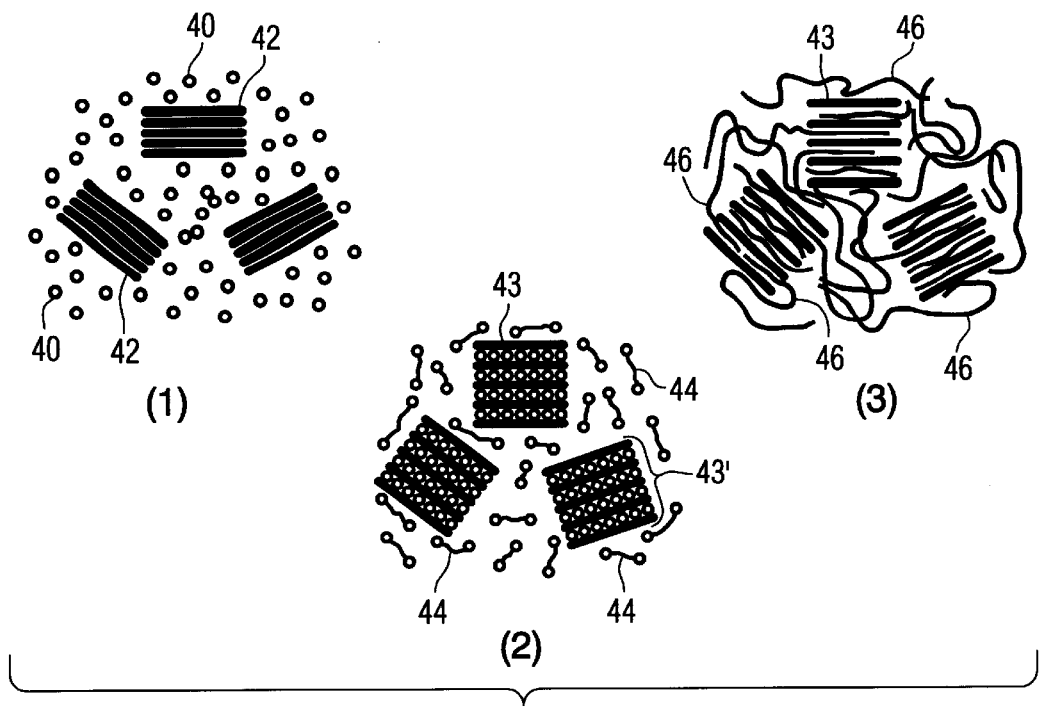
FIG. 4 is an idealized schematic of a reaction sequence used in this invention.

The reaction sequence useful to provide the insulated conducting member of this invention is shown generally in FIG. 4. An oligomer would be prepared containing Cr, Sn, Zn or their mixtures. This can be accomplished, generally, by the reaction of a strong acid (that is, Perchlorie acid) with a metal salt [chromium nitrate, Tin chloride dehydrate, Zinc nitrate hydrate] in a queous solution.

One particularly useful Cr (III) oligomer is a Chromium (III) 24-Bentane dionate having the chemical formula:

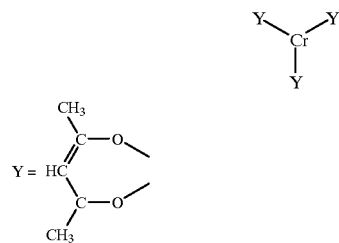

Oligomers of this type are shown as 40 in FIG. 4.

These oligomers can, optimally, be reacted with each other to form dimer chains in the form of panler sheets about 0.0004 to 0.0009 micrometers (4 to 9 Angstrom Units) thick, for example:

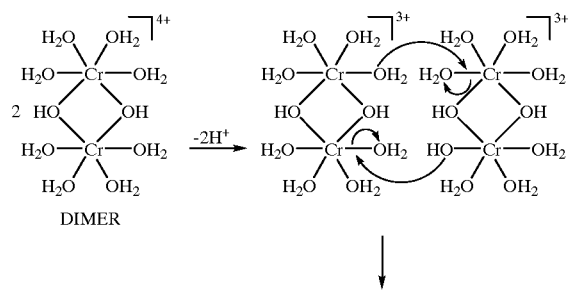

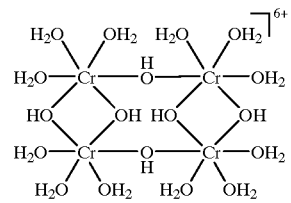

As taught by Drljaca et al. in *Inorganica Chimica Acta*, 256 (1997) pp 151–154.

A solid Al.Si.O based material having a platelet form and having spaces between their constituent platelets, capable of being expanded, such as an unmodified mica-type silicate is generally shown as 42 in FIG. 4. For example, unmodified muscovite mica, phlogopite mica or clay type silicates such as montmorillonite, or their mixtures, can be treated to expand or further "open" spacing between constituent platelets, such material generally shown as 43, so that oligomers and organic resin molecules can intercalate into the mica or clay platelets, with the result shown in step (2). As a usual pre-step, these mica or clay platelets can be chemically treated by contact with amines, onium salts, such as ammonium salts, or other chemicals added in amounts effective to expand the interlayer distance or sprang of the mica or clay and help to make those materials less hydrophilic and more hydrophobic so that the generally hydrophobic polymer materials can more easily interact with the mica or clay.

In step 2, the metal containing oligomer 40 is inserted or disposed within, that is, intercalated into opened Al.Si.O based material, as described previously in the Background, to provide structure 43', for example muscovite $KAl_2AlSi_{r3}O_{10}(OH)_2$, phlogopite $KMg_3AlSi_3O_{10}(OH)_2$ or montmorillonite $Al_2O_3.4SiO_2.H_2O$. This is carried out, in one method, by dissolving the metal containing oligomer in a suitable solvent, for example a ketone Chromium(III) 2.4-pentanedionate and then contacting the Al.Si.$O_2$ based material with the solution for an effective time, followed by drying.

The metal containing oligomer, now disposed within the "opened" Al.Si.O material, the whole shown as 43', is then interacted with a suitable resinous composition which can polymerize with itself and also with the metal containing oligomer disposed within the Al.Si.O material. The intercalated mica, clay or the like, 43', is shown in step (2) mixed with a suitable resinous composition 44. Oligomer-metal containing the range of Al.Si.$O_2$ to resin is from about 3 wt % to 35 wt %, preferably 5 wt % to 20 wt %. Upon heating the resinous composition 44 will chain link to form polymers 46 around and within the Al.Si.O material 43 as shown in step (3) of FIG. 4.

The mechanism responsible for protecting polymer materials from electrical breakdown can be described as follows. Mica is unique amongst materials in having a high resistance to partial discharges thereby increasing the voltage endurance and prolonging the life of insulation materials. It is now generally believed that the mechanism responsible for this protective behavior is electronic in nature and not physical. The high energy electrons resulting from partial discharges (sometimes referred to as "electron avalanches") are slowed down and deenergized by the strong positive fields generated by the arrays of $K^+$ ions held within the silicate lattice galleries. It is this effect which is apparently primarily responsible for the protective nature of mica in high voltage insulation systems.

As will become clear later in this patent application, the concepts and technical approaches pursued here build upon this electron deactivation mechanism. The choice of transition metal salt can be guided by considering the charge/size ratio. One mechanism by which mica is effective at scavenging free electrons is the presence of $K^+$ ions in the lattice galleries. These ions are typically held very tightly and are very effective scavengers of free electrons.

Typically the transition metal ions have higher charge and smaller size, thus having a much higher charge/size ratio. Some examples are given in the following Table. The concept is that replacing $K^+$ ions in these lattice galleries with some of the metal ions shown in the following Table will give insulation materials with even more effective partial discharge protection (and hence longer voltage endurance) than is found with mica. This is because the higher charge/radius ratio of these metal ions will give more efficient deenergizing of the fast electrons which are responsible for damaging insulation materials.

TABLE

Comparison of the charge/radius ratio of various cations.

| Ion | Charge | Radius (A) | Charge/radius Ratio |
| --- | --- | --- | --- |
| $K^{(I)}$ | 1 | 1.51 | 0.66 |
| $Cr^{(III)}$ | 3 | 0.62 | 4.84 |
| $Sn^{(II)}$ | 2 | 0.93 | 2.15 |
| $Zn^{(II)}$ | 2 | 0.60 | 3.33 |
| $Li^{(I)}$ | 1 | 0.76 | 1.32 |
| $Mg^{(II)}$ | 2 | 0.72 | 2.78 |
| $Mn^{(II)}$ | 2 | 0.72 | 2.41 |
| $Mn^{(III)}$ | 3 | 0.645 | 4.65 |
| $Fe^{(II)}$ | 2 | 0.78 | 2.56 |
| $Fe^{(III)}$ | 3 | 0.645 | 4.65 |
| $Co^{(II)}$ | 2 | 0.745 | 2.68 |
| $Co^{(III)}$ | 3 | 0.61 | 4.92 |

The resulting composition can be applied to an electrical member, for example, a wire, or coil, an electronic component or the like. The insulating effect of the composition is extraordinary and will be such that it can be applied in cross-sections as thin as 0.06 cm. When fully developed, these new dielectric materials could be used in a high performance molding resin or be used as a replacement for advanced mica tapes for vacuum pressure impregnating resin manufacture. The ultimate pay-off would be the opportunity to drastically reduce their groundwall thicknesses dramatically beyond the present levels. Ultimately an insulation system, that is, 0.005 om (0.002 inch) thickness, for generator coils could quite possibly be the outcome of this development. The very high dielectric capability of these materials would allow this extremely thin insulation layer to be used.

A variety of other high voltage applications could benefit from these materials by developing improved insulation for rotors, high dielectric patches for repairing damaged stator coils and solid insulation for phase leads and series connectors in high temperature air-cooled generators.

The invention will now be further illustrated by way of the following examples.

EXAMPLE 1

The type of mica-type silicate used in this experiment was montmorrillonite silicate clay (Tradename "K-10") from the Aldrich Chemical Co. This material had the following characteristics: a free-flowing white powder, with a particle surface area of 220–270 $m^2/g$ and a bulk density of 300–370 g/l. A solution of 1 g octadecylamine ("ODA"), a primary amine (also from Aldrich Chemical Co.) in 150 ml. Ethanol/water (50/50 v/v) was heated to 45° C. Separately 1 g of the silicate clay was suspended in 100 ml water and added to the octadecylamine solution to "open" the platelet distances. After heating at 70° C. for 10 hours, the mixture was filtered and washed with fresh ethanol/water (50/50 v/v). The product was dried in air and then in a vacuum oven at 50° C. for 10 hours, so that, at the end of that time, the silicate clay had a more open structure suitable for intercalation. The silicate was subsequently treated with Chromium (III) 2,4-pentanedionate having the chemical formula $[C_5H_7O_2]_3Cr$, available from Aldrich Chemical Company. This reaction was carried out by dissolving the Chromium compound in methylethyl ketone and stirring at room temperature with the silicate for 2 hours. The resulting product was air-dried and then put in a vacuum oven at 50° C. for 12 hours, to provide a $Cr(3^+)$ intercalated clay.

The Chromium intercalated clay was then suspended in a liquid polyepoxide vacuum pressure impregnating resin, made according to the teachings of U.S. Pat. No. 4,254,351, and cast into 10.2 cm diam. cake samples. These samples were gelled for 2 hours at 135° C., and then heated for 16 hours at 150° C. until they were fully cured. Typically, the Chromium intercalated silicate was added at level of 10% (by weight) to the epoxy resin. Control samples of the polyepoxide resin alone were also cast into 10.2 cm diam cakes and cured as above.

Figure 5:
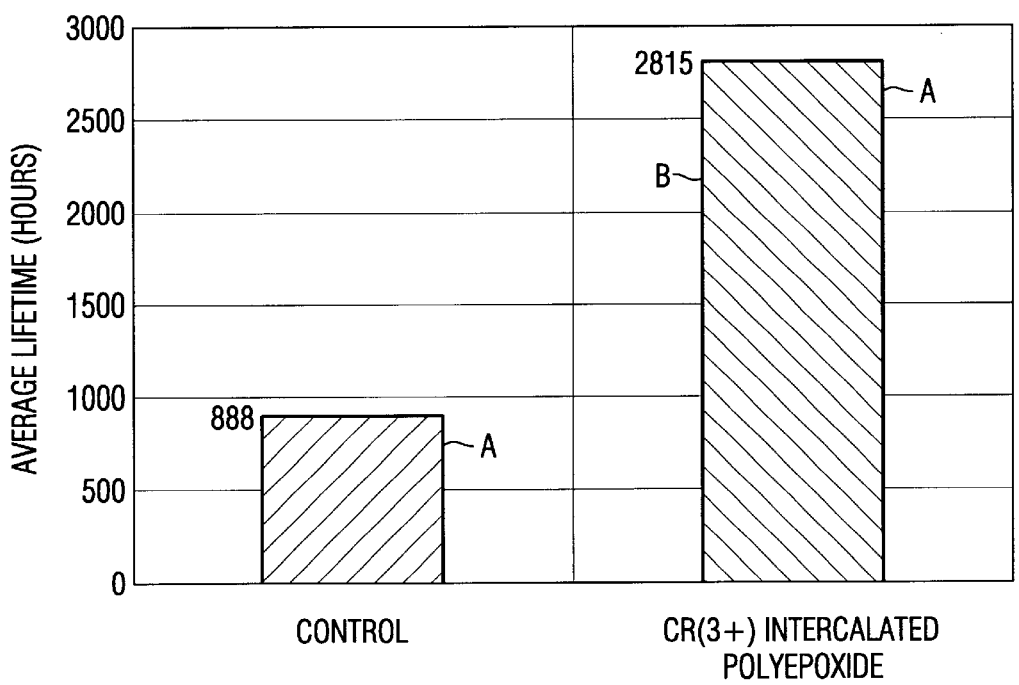
FIG. 5, is a comparative graph of Average Lifetime of a control sample (A) and the intercalated material (B) of this invention.

The cured, $Cr(3^+)$ intercalated samples, along with the epoxy "control samples" were then put on long-term Voltage Endurance testing. Typically, the samples were tested at 24 Kv under oil with an applied voltage stress of about 7.5 Kv/mm (188 volts/mil) and the lifetimes to failure were observed. The results are shown in FIG. 5, where the Average Lifetime is shown in hours. This data is the Average Lifetime of four or more test samples in each group. It is clear from the results that the epoxy resin containing the Chromium-intercalated silicate additive Samples B, has a Voltage Endurance Lifetime more than three times that of the "control" Samples A, thereby dramatically demonstrating the dielectric strength benefit of the addition of the chromium intercalated silicate.

Recognizing that these initial experiments were done with a normal particle size clay (not a nano-size clay platelet) and the Chromium compound used for intercalation was a standard Chromium (III) variety, it would be expected that even more dramatic Voltage Endurance performance would be found using Chromium Oligomers and nano-size clay platelets for the reasons that were discussed earlier in this specification, that is, more effective intercalation with Chromium and better dispersion of the dielectric enhancing additives in the resin matrix. Equally good results should result using Sn or Zn as a replacement for Cr, and styrenated polyepoxides, polyesters and 1,2-polybutadiene resins could substitute for the polyepoxide (epoxy) used above.

EXAMPLE 2

In addition to the long-term voltage endurance tests, described in Example 1, there are other important tests to be used in the evaluation of high voltage electrical insulation. One such test is the short-time Dielectric Strength measurement (ASTM D-149) which involves the placement of cured samples of resin (typically about 110 mils in thickness) between two electrodes under oil. The applied voltage is increased from zero to breakdown in a uniform, specified rate from 0.5 to 1.0 Kv per second. Typically for electrical insulation of the thicknesses specified above, the voltage will exceed 35 Kv before breakdown will occur. The dielectric strength voltage breakdown value is then calculated from the voltage at breakdown divided by the sample thickness (Volts/mil).

Samples of the various intercalated clays were prepared and cured as described previously in Example 1, and tested using the ASTM D-149 test procedure. In this series of experiments, small-particle size nanoclays, intercalated with chromium oligomers, were also included. The experimental results found are summarized in the following Table:

SHORT-TERM VOLTAGE BREAKDOWN DATA FOR VARIOUS INTERCALATED CLAYS.

| RESIN TYPE USED | CLAY ADDITIVE (% w/w) | INTERCALATED ORGANO-METALLIC COMPOUND | VOLTAGE BREAKDOWN (Volts/mil) |
|---|---|---|---|
| **Styrenated-epoxy | None | None | 360 |
| **Styrenated-epoxy | Bentonite/ODA(1%) | None | 365 |
| Styrenated-epoxy | Bentonite/ODA(1%) | Sn | 378 |
| **Styrenated-epoxy | KSF/ODA(5%) | None | 379 |
| Styrenated-epoxy | KSF/ODA(9%) | Sn | 425 |
| **Styrenated-epoxy | K-10/ODA(1%) | None | 373 |
| Styrenated-epoxy | K-10/ODA(9%) | Cr | 447 |
| Styrenated-epoxy | K-10/ODA(1%) | Sn | 382 |
| **Styrenated-epoxy | Nanoclay CWC/ODA(5%)* | None | 327 |
| Styrenated-epoxy | Nanoclay CWC/ODA(5%)* | Cr | 402 |

Using the ASTM D-149 test procedure
**Comparative Examples without intercalated organo-metallic compound
*Supplied by Nanocor Corp. as a 50% ODA exchanged CWC clay (Nano #741A)
ODA = octadecylamine
KSF = a type of montmorrillonite clay
R-10 = a type of montmorrillonite clay
CWC = a complex water clay; an aqueous slurry of a type of montmorrillonite clay.

The results show that when a clay material is intercalated with metals such as Cr and Sn and added to an epoxy resin at a 1% to 9% level, the short-time voltage breakdown values are considerably enhanced. This was especially true of the nanoclay sample intercalated with chromium oligomers where the dielectric strength of the epoxy was increased by about 23% compared to the unintercalated nanoclay sample. It was also observed that the intercalated nanoclay material was easier to mix and disperse in the epoxy resin than the other intercalated clay samples thereby giving more homogeneous distribution throughout the sample during cure.

While specific embodiments of the invention have been described in detail, it will be appreciated by those skilled in the art that various modifications and alternatives could be developed in light of the overall teaching of the disclosure. Accordingly, the particular arrangement disclosed are meant to be illustrative only and not limiting as to the scope of the invention, which is to be given the full breadth of the claims appended and any and all equivalents thereof.

What is claimed is:

1. An electrically conducting member, insulated with a coating of a resin interactive with and bonded to an oligomer which contains a metal selected from the group consisting of Cr, Sn, Zn and mixtures thereof, said oligomer disposed within an Al.Si,O containing structure, wherein said structure constitutes from about 3 wt. % to 35 wt % of the resin weight.

2. The insulated member of claim 1, wherein the member is a metal coil.

3. The insulated member of claim 1, wherein the member is a wire.

4. The insulated member of claim 1, wherein the member is an electronic component.

5. The insulated member of claim 1, where the Al.Si.O containing structure is selected from mica silicates, clay silicates, and mixtures thereof.

6. The insulated member of claim 1, where the oligomer contains Cr.

7. The insulated member of claim 1, where the oligomer contains Sn.

8. The insulated member of claim 1, where the oligomer contains Zn.

9. The insulated member of claim 1, wherein the resin is selected from the group consisting of polyepoxide resins, styrenated polyepoxide resins, polyester resins and 1,2-polybutadiene resins.

10. The insulated member of claim 1, where the resin coating insulation have a voltage endurance greater than about 1000 hours at 7.5 Kv/mm (188 volts/mil).

11. The insulated member of claim 1, where the member is a copper coil in an electrical generator.

12. A resinous coating composition, suitable for use as an electrical insulation which comprises a resin interactive with and bonded to an oligomer which contains a metal selected from the group consisting of Cr, Sn, Zn and mixtures thereof, said oligomer disposed within an Al.Si.O containing structure, wherein said structure constitutes from about 3 wt. % to 35 wt % of the resin weight.

13. The composition of claim 12, where the Al.Si.O containing structure is selected from mica silicates, clay silicates, and mixtures thereof.

14. The composition of claim 12, where the oligomer contains Cr.

15. The composition of claim 12, where the oligomer contains Sn.

16. The composition of claim 12, where the oligomer contains Zn.

17. The composition of claim 12, wherein the resin is selected from the group consisting of polyepoxide resins, styrenated polyepoxide resins, polyester resins and 1,2-polybutadiene resins.

18. A method of making a resinous coating, suitable for use as an electrical insulation, comprising the steps:

(A) providing an oligomer containing a metal selected from the group consisting of Cr, Sn, Zn and mixtures thereof;

(B) providing a solid Al.Si.O based material having a platelet form and having spaces between their constituent platelets, which spaces are capable of being expanded;

(C) providing a liquid resin selected from the group consisting of polyepoxide resins, styrenated polyepoxide resins, polyester resins and 1,2-polybutadiene resins, which resins can interact and polymerize in the presence of Cr, Sr, and Zn;

(D) inserting the metal containing oligomer into the spaces within the solid Al.Si.O based material; and (E) causing the liquid resin and the solid metal inserted Al.Si.O based material to contact each other to form a resinous admixture such that the metal inserted Al.Si.O solids are dispersed within the liquid resin.

19. The method of claim 18 including the following additional steps:
(F) applying the resinous admixture to a substrate; and then
(G) heating the metal inserted Al.Si.O liquid resin admixture so that the resin interacts with the metal causing interaction of the liquid resin and the oligomer and polymerization of the resin around and with the Al.Si.O solids, to provide Al.Si.O solids within a cured polymerized solid matrix of resin.

20. The method of claim 18 where the Al.Si.O solid platelet material is treated by contact with materials which will expand spacing between constituent platelets in step (B), and where the Al.Si.O containing structure is selected from mica silicates, clay silicates, and mixtures thereof.

21. The method of claim 18, where the cured matrix of resin and Al.Si.O solids have a voltage endurance greater than about 1000 hours at 7.5 Kv/mm.

* * * * *